Figure 5:
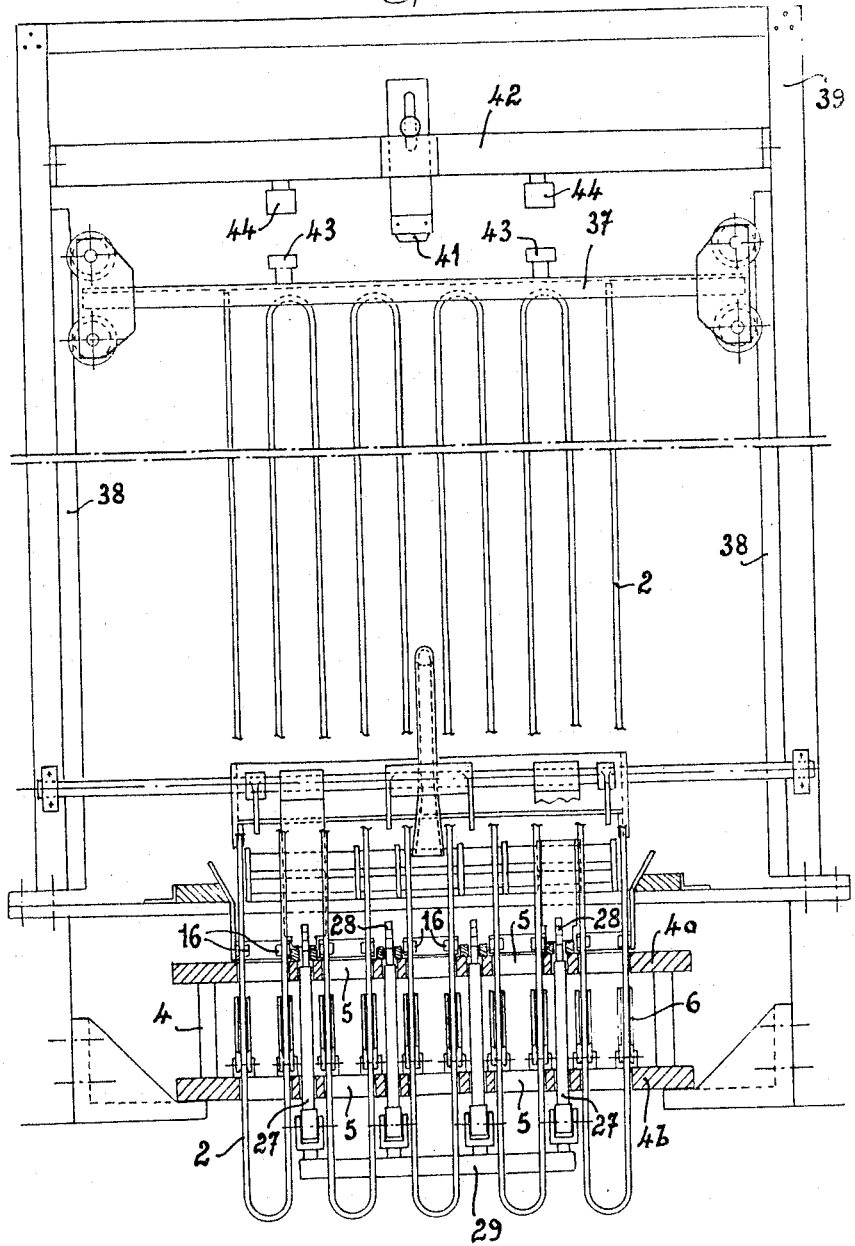

Nov. 29, 1966   R. SANDRET   3,288,976
APPARATUS FOR WELDING WIRES ON CONDENSER COILS
Filed Feb. 16, 1965   4 Sheets-Sheet 1
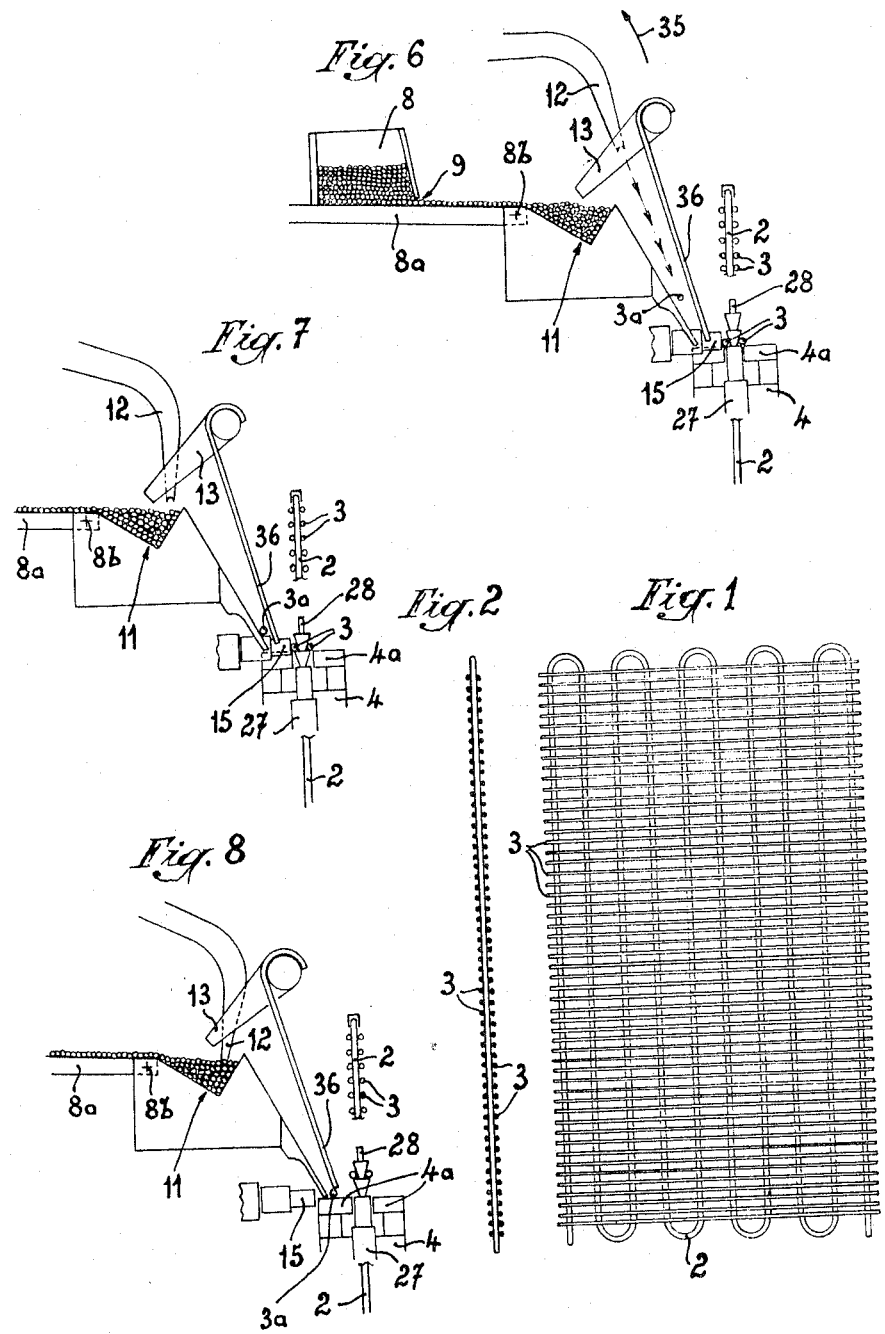
INVENTOR.
ROBERT SANDRET
BY
ATTY.

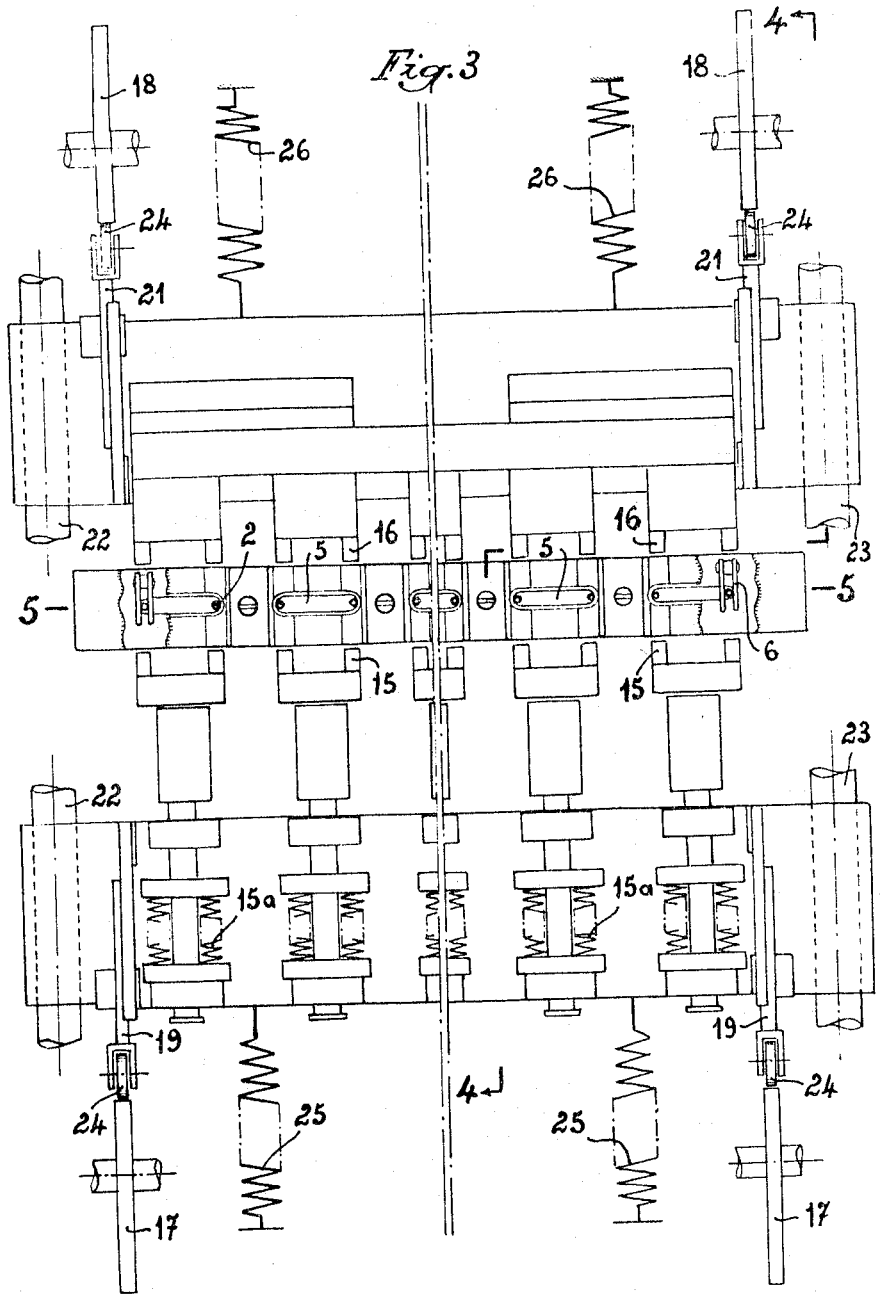

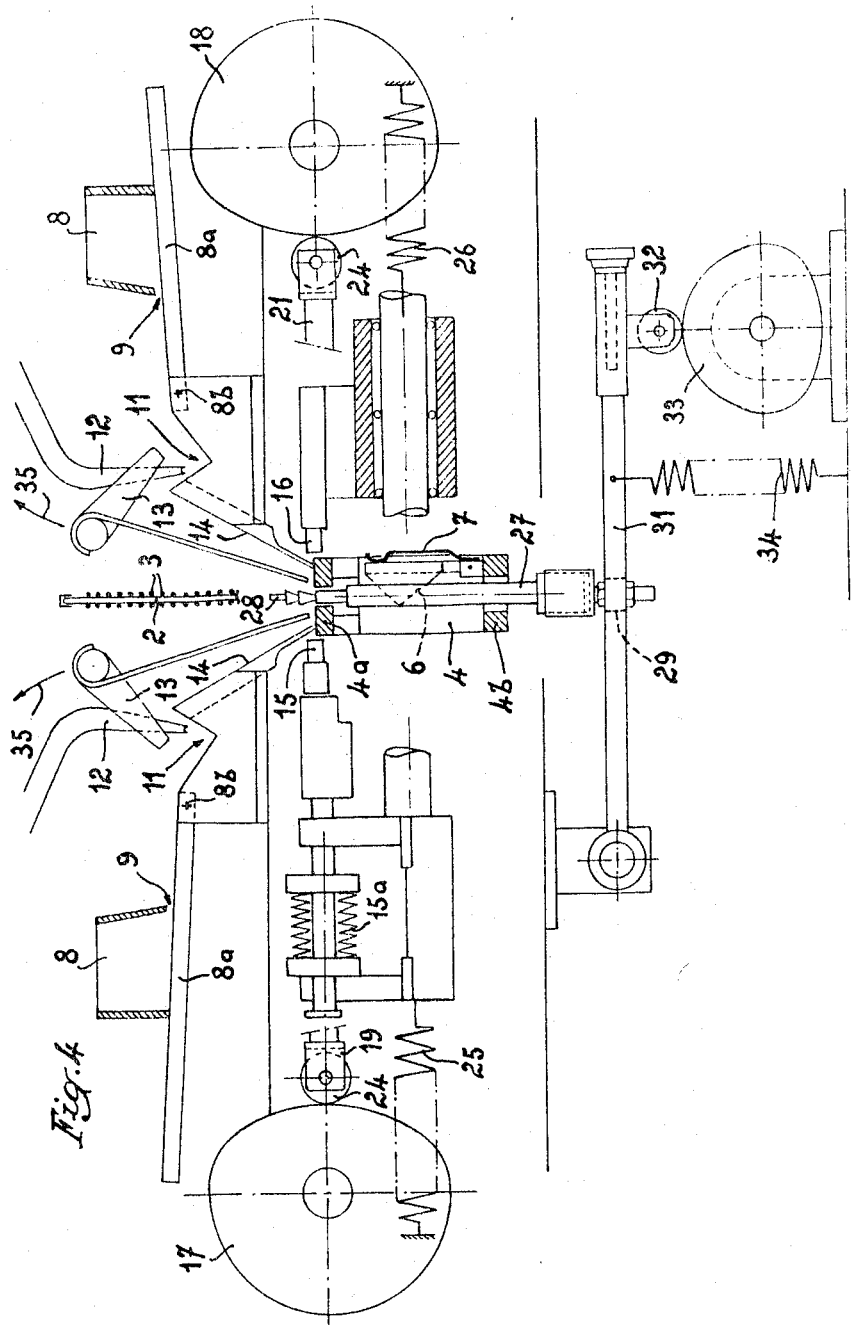

United States Patent Office 3,288,976
Patented Nov. 29, 1966

3,288,976
APPARATUS FOR WELDING WIRES ON CONDENSER COILS
Robert Sandret, 5 Rue Ferdinand Buisson, Lyon, France
Filed Feb. 16, 1965, Ser. No. 433,079
Claims priority, application France, Feb. 19, 1964, 44,485, Patent 1,394,957
9 Claims. (Cl. 219—56)

The condensers used in cold-producing apparatus include a flat tubular coil, the two opposite surfaces of which are connected through welding with wires or metal rods giving them the desired rigidity and taking part in the dissipation of heat. The fitting of said rods or wires is obtained by arranging the coil or actual condenser inside a frame and then aligning the wires transversely with reference to the condenser, with the aid of predetermined notches or reference marks on the above-mentioned frame after which the wires or rods are welded to said coil.

Such a method for connecting the wires is comparatively lengthy and this invention has for its object a much speedier method consisting in shifting the coil in a vertical plane in an intermittent manner, each displacement corresponding to the spacing between two successive transverse wires and each period of standstill between two successive movements being selected so as to allow the welding on the two opposite surfaces of the coil of two transverse wires which are fed each out of a supply of wires and are urged onto either side of the coil by two sets of electrodes moving symmetrically in a horizontal plane to hold said wires in position until they are welded to said coil.

This invention covers also a machine for executing such a method. Said machine includes means for guiding vertically the condenser coil, two supply means carrying wires and located to either side of the path followed by the coil, two suction nozzles adapted to raise in succession the transverse wires inside said supply means and releasing them thereafter above guiding slopes leading them towards the coil, two sets of electrodes located to either side of the path followed by the coil and moving symmetrically in a common horizontal plane with a view to urging the transverse wires onto the coil to weld them thereto and finally vertical pusher-members acting during their upward movement on the already welded wires in order to raise the coil a distance equal to the spacing between two successive transverse wires.

There is illustrated by way of example and by no means in a limiting sense in the accompanying diagrammatic drawings, a preferred embodiment of such a machine. In said drawings:

FIG. 1 and 2 are respectively a lateral and a front view of the finished condenser, FIG. 3 is a view from above of a machine according to this invention, the supply means carrying the transverse wires being removed and the coil being cut off in registry with the electrodes, FIGS. 4 and 5 are sectional views through lines 4—4 and 5—5 respectively of FIG. 3, FIGS. 6, 7 and 8 illustrate three stages of the operative cycle of the machine.

FIGS. 1 and 2 illustrate a condenser as it is obtained at the output of the machine, said condenser being constituted by a coil 2 each surface of which carries parallel transverse wires 3 welded thereto.

The machine for the execution of this improved method includes therefore a support 4, adapted to guide vertically the coil 2 which is being completed. Said support includes two bars 4a and 4b inside which are formed ports 5 which serve for the passage of the convolutions of the coil 2. In order that two sides of given convolution may remain parallel with each other, guiding is furthermore ensured by a vertical comb of which each tooth 6 has a horizontal U-shaped cross-section and is pivotally secured to the comb body, said teeth being held in the desired vertical position by springs 7. As illustrated in FIG. 4, the outline of each tooth 6 of the guiding comb is such that, upon introduction or removal of a coil 2, said tooth collapses against the action of the corresponding spring 7, whereas during the finishing stage in the making of the condenser, said teeth engage each one of the vertical sides of the coil.

The two halves of the machine are located to either side of the coil 2 which is being completed and these halves are substantially symmetrical. Two supply means 8 carrying transverse wires 3 allow the latter to slide out through a slot 9 until they reach the bottom of a corresponding V-shaped support 11. At each of the points thus reached by the transverse wires, the latter are raised each in its turn by a suction nozzle 12 from which they are removed under the action of stationary stops 13 before the suction nozzle 12 has reached its uppermost position. As a matter of fact, each suction nozzle 12 moves angularly between two extreme positions as illustrated in FIGS. 6 and 8. The transverse wires 3 drop then onto the sloping surfaces 14, leading them towards the coil 2 to either side of the latter.

Underneath the supply means 8 are located two sets of electrodes 15 and 16 that have reciprocatory movement towards and away from each other in a horizontal plane under the action of corresponding cams 17 and 18 on rods 19 and 21 to which said electrodes are secured. To this end, the two sets of electrodes 15 and 16 are carried by two rods 22 and 23 which serve as slideways for them. The cam followers 24 on the rods 19 and 21 are urged against the cams 17 and 18 by springs 25 and 26.

Vertical pusher-members 27 (FIG. 5) of which the upper ends 28 are cut in the shape of saw-teeth are adapted to move vertically inside the support 4 between the vertical sides of any two successive convolutions of the coil 2. The axes of the pusher-members 27 are located exactly in the plane of the coil 2, in other words between the two rows of transverse wires 3 which have already been welded to the coil 2. The maximum thickness of the teeth on the ends 28 of the pusher-members 27 is larger than that of the coil 2 and their minimum thickness is equal to or slightly less than that of the coil 2.

The push-members 27 are carried by a common horizontal bar 29 and their reciprocation in a vertical plane is controlled by a lever 31 connected with the bar 29 and carrying a cam-follower 32 urged constantly into contact with the periphery of a cam 33 by a spring 34. For each revolution of the cam 33, the lever 31 executes a complete oscillation and consequently this leads to a raising and lowering of the pusher-members 27.

The operation of the machine thus executed, is as follows:

Each suction nozzle 12 carrying a transverse wire 3a moves in the direction of the corresponding arrow 35. When it passes in registry with the cooperating stationary stop 13, the wire 3a is pulled off the nozzle and drops onto the sloping surface 14. At this moment, the two sets of electrodes 15 and 16 are in their operative welding position, in other words they urge the two wires 3 which have reached the surfaces 4 into contact with coil 2, and they execute the desired welding between the wires and the coil. The wires 3a referred to hereinabove drop onto the back of the electrodes 15 and 16 against which they are held by the stops 36 lying in front of them. Said first stage of the operative cycle is illustrated in FIG. 6.

FIG. 7 illustrates the second stage of said cycle. When the wires 3 have been actually welded to the coil 2, the pusher-members 27 sink by one increment of distance, that is by a distance equal to the spacing between two successive transverse wires 3 and the teeth formed by the ends 28 of the pusher-members urge apart as they pass downwardly the wires 3 which have just been welded, which is possible by reason of the resilience of said wires.

The downward movement of the pusher-members 27 occurs before the coil is released by the electrodes 15 and 16 so as to prevent any possible shifting of the coil under the action of the resilience of the wires 3 as the teeth of the ends 28 of the pusher-members 27 move past the coil.

At this moment, the third operative stage begins, which cycle is illustrated in FIG. 8. The electrodes 15 and 16 move away from the coil 2 so that the wires 3a may drop onto the support 5 and be thus located in the welding plane, that is in the plane passing through the axes of the electrodes 15 and 16 after which said electrodes move until they urge the wires 3a against the coil 2 and weld them thereto while the nozzles 12 move downwardly back towards the supply means 8.

Simultaneously, the pusher-members 27 are shifted upwardly and return to their original position illustrated in FIG. 6. But during this upward motion the teeth on their ends 28 engage the undersides of the transverse wides 3 which have been previously welded and since they cannot escape the latter, they produce a corresponding upward movement of the coil 2.

The different parts have thus returned to the position occupied originally as illustrated in FIG. 6, and the operative cycle begins over again.

In order that, for each operative cycle, each suction nozzle 12 may take hold of only one transverse wire 3, the end of each suction nozzle is constituted by a slot of which the breadth corresponds to the diameter of the wires 3, while the walls of the slot along its short sides are recessed as clearly shown in FIGS. 6 and 7 along semi-circular lines.

With a view to ensuring the downward movement of the wires 3 down to the bottom of the V-shaped supports 11, that is down to the level at which they are taken hold of by the suction nozzles 12, the supply means 8 carried by supports 8a pivotally secured at 8b are subjected to a vibratory movement.

As is apparent from an inspection of FIG. 4, the set of electrodes 15 is carried by spring-urged rods 15a. Said arrangement has for its object to provide compensation for the reduction in the thickness of the system including the coil 2 associated with two wires 3 during the welding operation by reason of the extrusion of the metal, and this compensation consequently ensures throughout the duration of the welding stage, the pressure required for the latter.

FIG. 5 shows that the support 4 guiding the coil 2, is surmounted by a carriage 37 adapted to move vertically between two vertical rails 38 carried by a stirrup-shaped support 39. Said carriage 37 holds the last wires 3 which have been welded to the coil 2 in contact with the support 4 or with the teeth on the pusher-members 27 during their upward movements. Furthermore, by reason of its engagement with the upper ends of the coil convolutions, the carriage is held thereby in a vertical plane. The carriage 37 controls also the stopping of the machine through action on a micro switch 41 which the coil reaches when it is completely finished, upon rising to its uppermost position. The position of the bar 42 carrying the switch 41 is adjustable and depends on the size of the coil to be transformed into a condenser.

When the machine has stopped under the action of the carriage 37 engaging the micro switch 41, it is sufficient for the operator to remove the finished condenser and to replace it by a plain coil. To this end, he raises the carriage 37 to a level at which the cooperating magnets 43 and 44 hold the carriage in its uppermost position. After positioning a further coil, it is easy for the operator to separate the magnets 43 and 44 and to return the carriage 37 to its lower position.

The electrodes are fed with a welding current at the desired moment by a contact-maker actuated by a cam; however, any suitable control system may be resorted to.

By reason of the presence of a number of cams against which powerful springs urge the transmitting levers, it may occur, if the machine stops just before the outermost point of a cam has reached the cam follower carried by the lever controlled by said cam, that the pressure exerted on said cam by said lever produces a rearward motion. With a view to preventing any such mishap which would be detrimental for the proper operation of the machine, the transmission chains or belts transmitting to the camshafts the desired rotary movements pass also over free-wheel pinions adapted to serve as tensioning means. Another solution to this problem, which is however a more expensive one, consists in resorting to motors adapted to exert a braking action.

What I claim is:

1. Apparatus for welding a series of wires on at least one side of a flat condenser coil along parallel lines spaced by predetermined uniform intervals, the coil having a plurality of parallel straight interconnected legs and the wires being perpendicular to said straight legs, comprising means for feeding wires one by one to at least one side of the coil, welding means for successively welding said wires to the coil, and reciprocating conveyor means engageable with the immediately previously welded wire to move said coil in its plane a distance equal to said predetermined interval, said feeding means feeding wires simultaneously to opposite sides of said coil in opposed relation to each other.

2. Apparatus as claimed in claim 1, said reciprocating conveyor means having alternate advancing movement and return movement and engaging both of the immediately previously welded opposed wires to move said coil in its plane upon said advancing movement, said conveyor means being withdrawable between the next welded pair of opposed wires upon said return movement.

3. Apparatus as claimed in claim 2, said conveyor means having pusher means that extends between said pairs of opposed wires and that has a portion wider than the distance between the wires of each of said opposed pairs, said pusher means upon said return movement forcing apart and passing between the immediately previously welded pair of opposed wires.

4. Apparatus for welding a series of wires on both sides of a flat condenser coil along parallel lines spaced by predetermined uniform intervals, the coil having a plurality of parallel straight interconnected legs and the wires being perpendicular to said straight legs, comprising means supporting the coil with its plane upright, means for feeding a pair of wires to opposite sides of the coil with the wires horizontal and in opposed relation to each other, welding means for simultaneously welding both of said opposed wires to the coil, and means for intermittently moving the coil in its plane a distance equal to said predetermined interval.

5. Apparatus as claimed in claim 4, said feeding means comprising suction conveyor means having an elongated slot with partial circular recesses at opposite narrow ends of the slot.

6. Apparatus as claimed in claim 4, said welding means comprising opposed electric welding members horizontally reciprocal toward and away from each other on opposite sides of said opposed pairs of wires.

7. Apparatus as claimed in claim 6, and gravity chute means for feeding wires to upper portions of said welding members, movement of said welding members away from each other permitting said gravity-fed wires to fall in front of the welding members so that movement of the welding members toward each other places the wires in welding position against the coil.

8. Apparatus for welding a series of wires on at least one side of a flat condenser coil along parallel lines spaced by predetermined uniform intervals, the coil having a plurality of parallel straight interconnected legs and the wires being perpendicular to said straight legs, comprising means for feeding wires one by one to at least one side of the coil, welding means for successively welding said wires to the coil, and conveyor means for moving the coil in its plane, said feeding means comprising suction conveyor means having an intake slot which is elongated and terminates at its ends in a pair of short sides having concave partial circular edges so that the conveyor means can pick up only a single wire.

9. Apparatus as claimed in claim 8, and cam means for stripping the wires from said slot upon movement of said suction conveyor means.

References Cited by the Examiner

UNITED STATES PATENTS

| | | | |
|---|---|---|---|
| 1,961,991 | 6/1934 | Southwell | 219—56 X |
| 2,422,829 | 6/1947 | Fotie | 219—56 |
| 2,477,894 | 8/1949 | Pityo et al. | 219—79 |
| 2,810,817 | 10/1957 | Brems et al. | 219—56 X |
| 3,019,326 | 1/1962 | Kary | 219—56 |
| 3,065,328 | 11/1962 | Brown | 219—64 X |

RICHARD M. WOOD, *Primary Examiner.*

ANTHONY BARTIS, *Examiner.*

B. STEIN, *Assistant Examiner.*